Patented Mar. 9, 1937

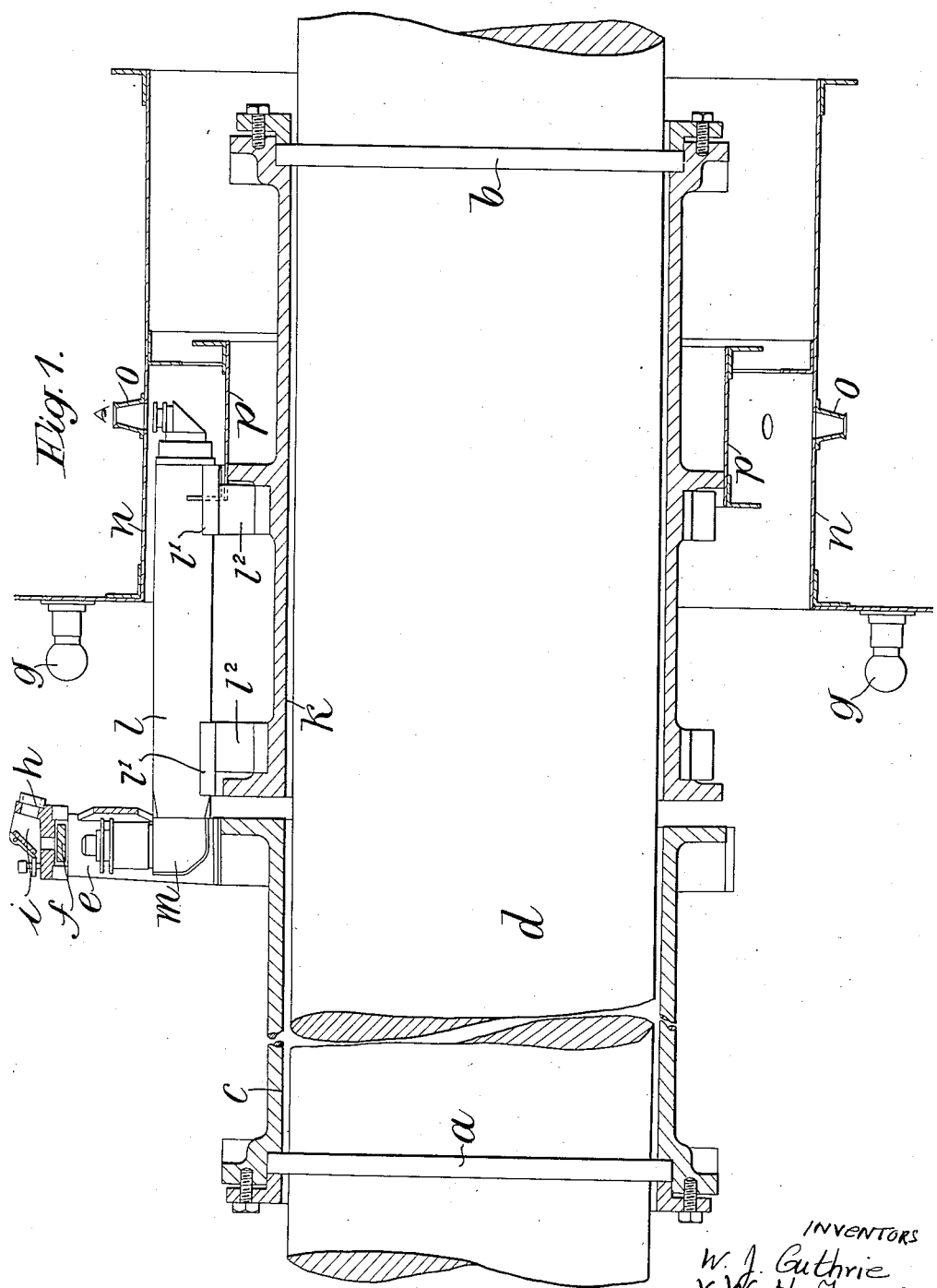

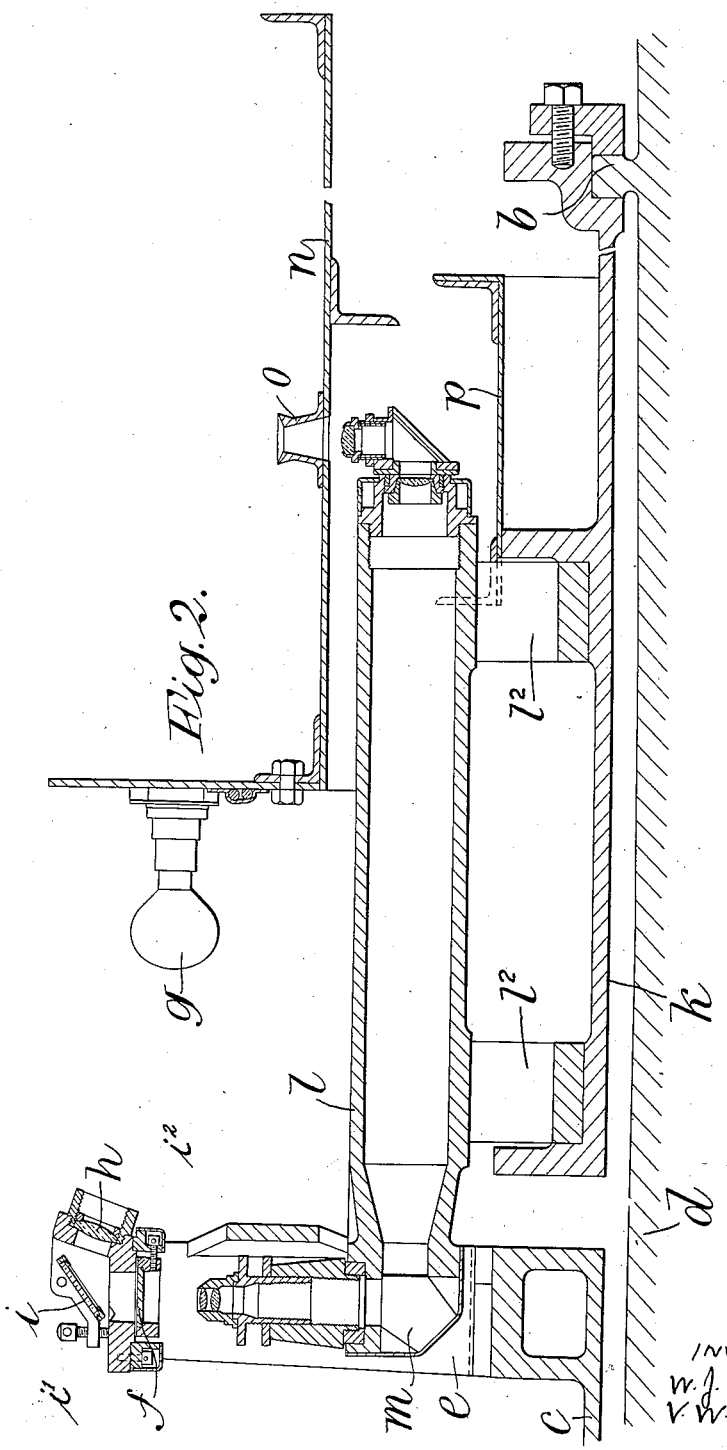

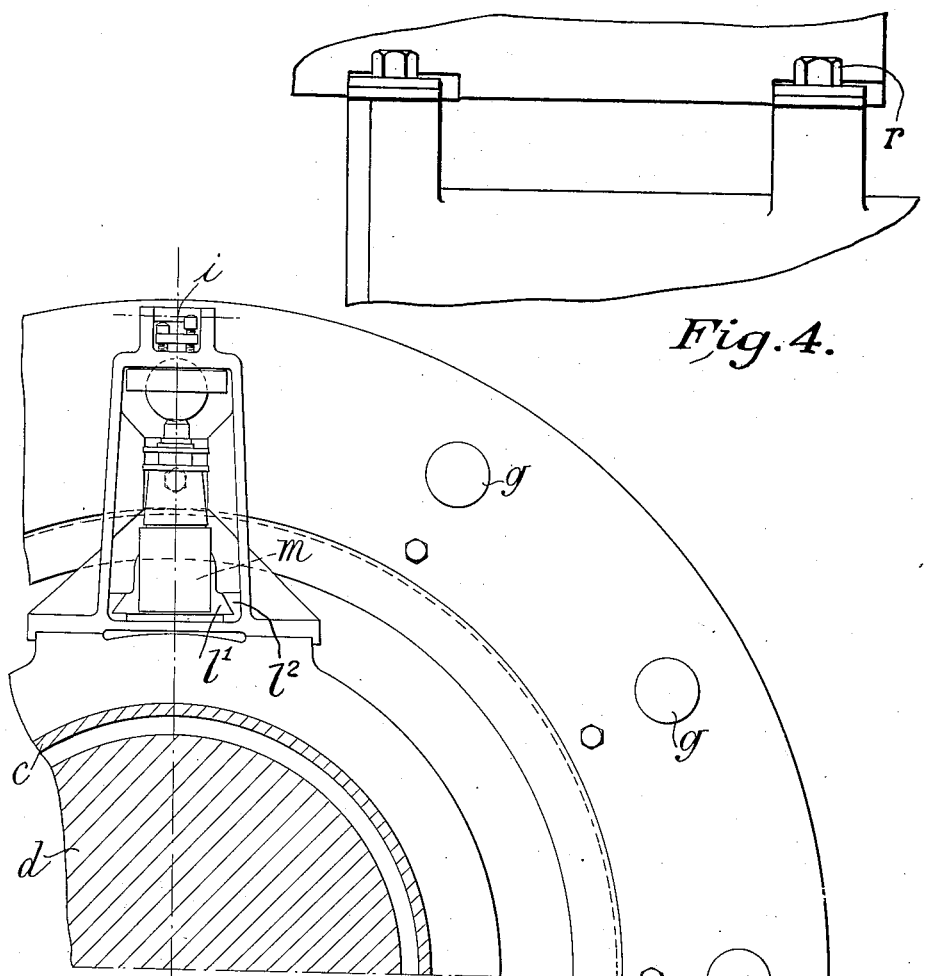
Fig. 4.
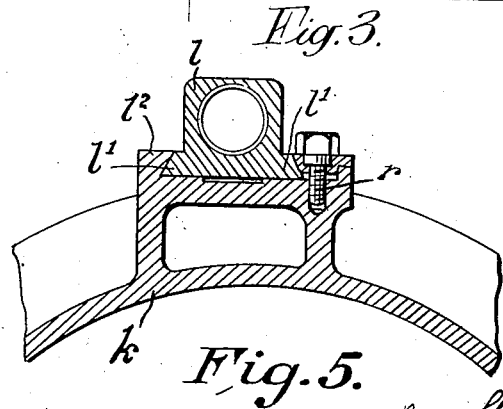
Fig. 3.
Fig. 5.

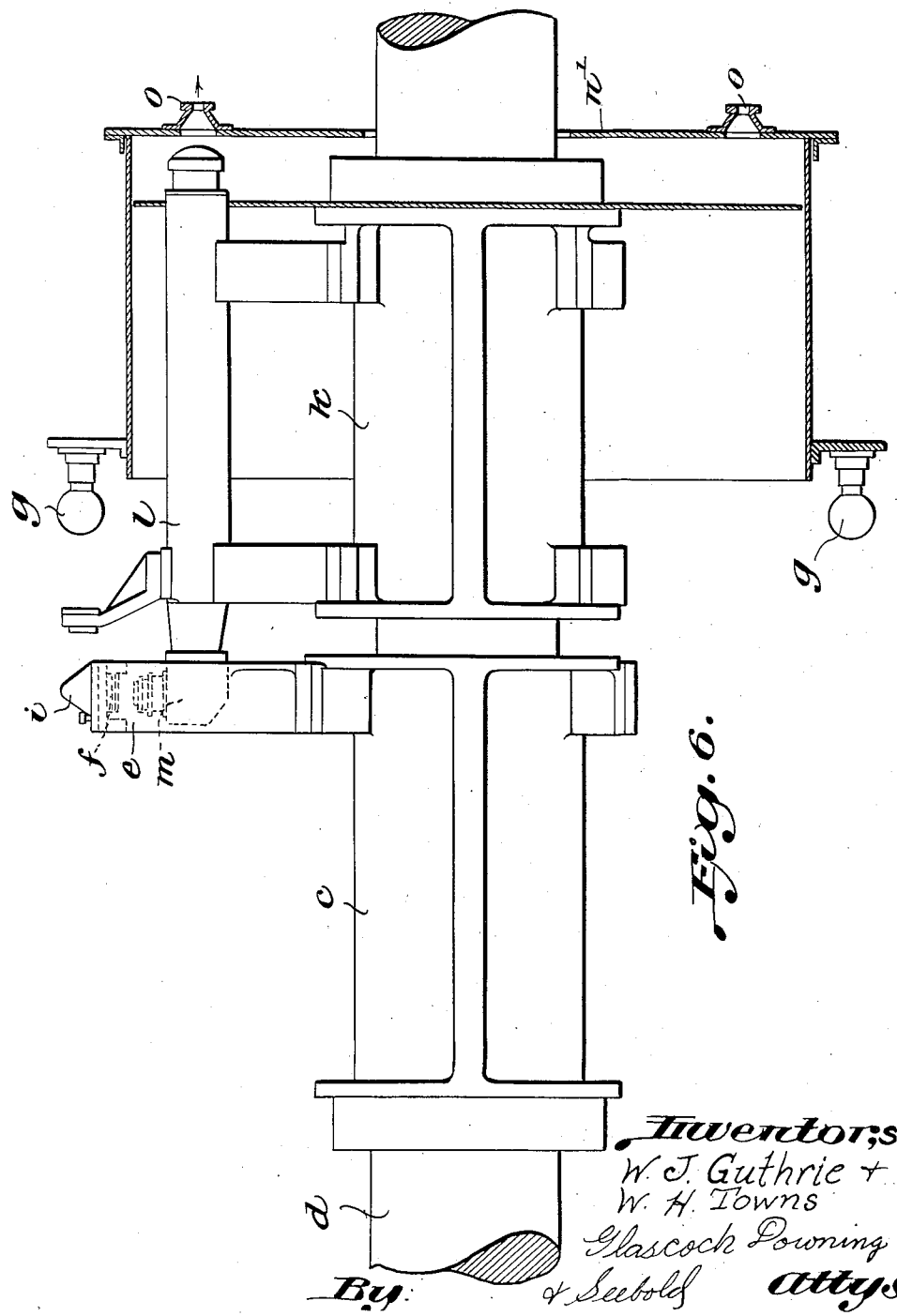

2,073,206

UNITED STATES PATENT OFFICE 2,073,206

TORSION METER

William James Guthrie and Victor William Henry Towns, London, England, assignors to E. R. Watts & Son Limited, London, England Application November 30, 1934, Serial No. 755,279½. In Great Britain December 6, 1933

5 Claims. (Cl. 265—25)

This invention relates to torsion meters such as are employed for measuring the torque in shafts when rotating and transmitting power from one point to another and for other purposes for which a measurement of the degree of twist in an elastic member is required, the invention having reference to torsion meters of the kind in which the torque is measured by measuring the relative angular twist between two defined and axially spaced points in the shaft or like member.

The object of the present invention is to devise an improved form of torsion meter of the kind referred to which will be simpler to use and more accurate in the results obtained than those hitherto proposed or adopted, and the invention consists in a torsion meter of the kind referred to comprising two members respectively secured at axially separated points to the shaft or other member submitted to torsional stresses and optical means for giving a magnified indication of the relative angular displacement of said members corresponding to the angular twist of the shaft or member between such separated points.

The invention also consists in a torsion meter according to the preceding paragraph comprising a microscope and scale carried respectively upon cylinders or sleeves, each of which is clamped at one end only to a flange formed on or rigidly secured to the shaft or the like, the flanges being suitably spaced apart from one another.

Further features of the invention will be apparent from the description given hereafter.

The accompanying drawings illustrate one mode of carrying out the invention.

Figure 1 is a part sectional elevation showing one form of torsion meter according to the invention mounted for use upon a shaft.

Figure 2 is an enlarged view of a part of the apparatus shown in Figure 1.

Figure 3 is an end view of Figure 2,

Figure 4 is a side elevation of means mounting the telescope on a sleeve on the shaft, Figure 5 is a transverse section through the mounting means, and Figure 6 is a similar view to Figure 1 illustrating a modification.

In carrying our invention into effect in one convenient manner as, for example, when producing a torsion meter for measuring the torque in, say, a ship's propeller shafting we arrange for two flanges or collars $a$, $b$ to be formed upon the shaft at a suitable distance apart or said flanges may be separately formed and rigidly secured to the shaft. The diameter of the collars is large compared with their thickness so that the shear stress in the shaft does not travel far into the collars but is confined almost entirely to the parts adjoining the shaft and hence the twist in the outer portions of the collars on which the torsion meter is mounted is negligible and will not impair the accuracy of the instrument.

To one flange $a$ we bolt or otherwise rigidly secure a sleeve $c$ adapted to surround the shaft $d$ and of an internal diameter slightly in excess of the diameter of the shaft so as to leave a certain amount of clearance whereby the sleeve is secured to the shaft at one end only. Upon the free end of this sleeve we arrange any suitable form of housing $e$ carrying a suitably calibrated scale $f$ the face of which is arranged at right angles to a radius of the shaft and which may when necessary or desirable be illuminated from an external source of illumination such as an electric lamp bulb $g$, the rays of which may, for example, pass through a suitable lens $h$ onto a mirror $i$ within the housing and by which the light is directed on to the scale which may be formed of translucent glass or any other suitable material.

Upon a second sleeve $k$ secured to the other flange $b$ upon the shaft we mount a microscope $l$ of suitable form and the mounting may be effected by means of slides $l^1$ on the microscope casing engaging in corresponding guides $l^2$ on the sleeve $k$ or other arrangement which will permit of axial adjustment of the microscope so as to provide for its accurate alignment with the scale, any suitable clamping means such as the holding plate and clamping screw being provided for holding the microscope rigidly in any position to which it may be adjusted upon its slide. The microscope is conveniently fitted with an index line and final adjustment of the scale and index line may be effected by the use of scale adjusting screws $i^1$ and $i^2$.

In one convenient construction the objective end of the microscope may project within the housing $e$ containing the scale and such that the axis of the objective lens is radial to the shaft while the main tubular casing of the microscope is parallel to the shaft, there being a pentagonal or other prism $m$ or other arrangement for reflecting the rays passing through the objective along the tubular body of the microscope and maintaining the optical axis in alignment with the longitudinal axis of the microscope tube under all conditions.

The eyepiece end of the microscope may be arranged for axial observation, or, for radial observation and in either case we prefer to provide a baffle $n$ fixed to an independent and stationary support to facilitate such observation, the baffle being in the form of a cylinder for radial observation and in the form of a disc or annular plate $n^1$ (Figure 6) for axial observation.

In either modification we prefer to give what we may term a long eye point to the microscope, that is, we arrange the same so that observation may be readily effected with the observer's eye located at some distance from the actual microscope eyepiece, and in this way the fixed baffle will not in any way inconvenience the observer. We may achieve this object by omitting the field lens from the microscope and by using a relatively large eyepiece lens.

The baffle $n$ may in some cases be employed to carry the lamp or lamps for securing the necessary illumination of the microscope field. The arrangement is such that when the shaft is rotating under load the displacement of the optical axis of the microscope relative to the zero or other point of reference upon the scale will be a measure of the torque in the shaft, it being obvious that power output may be readily calculated if the revolutions be known.

The baffle may be fitted with one or more plain apertures through which the necessary observations are made or preferably it is fitted with a fixed eye shield $o$ which may be a frusto conical or other fitting or mounting upon the baffle, there being one such eye shield at each observation point in the baffle.

If desired, we may provide a neutral or dark background $p$ against which the image of the scale will be thrown into prominence to facilitate observation.

The invention is not to be limited to the foregoing details which are given by way of example only as we may modify the form and method of mounting of our scale and the construction of microscope or like optical system to be used in conjunction therewith and the means adopted for securing both parts to axially spaced points upon the shaft or other device depending upon any practical requirements that may have to be fulfilled.

Having now described our invention, what we claim as new and desire to secure by Letters Patent is:—

1. A torsion meter of the kind referred to comprising two sleeves, each of which is clamped at one end only to a rotating part submitted to torsional stresses, a scale carried on one of said sleeves, a microscope carried upon the other sleeve and co-operating with said scale and a stationary baffle surrounding the rotating parts and having an observation aperture therein through which the image of the scale in the field of the microscope may be viewed.

2. A torsion meter of the kind referred to comprising two sleeves, each of which is clamped at one end only to a rotating part submitted to torsional stresses, a scale carried upon one of said sleeves, a microscope adjustably carried upon the other sleeve and co-operating with said scale, a stationary baffle surrounding the rotating parts and having a viewing aperture therein through which the image of the scale in the field of the microscope may be viewed and means carried by the baffle for illuminating said scale.

3. A torsion meter of the kind referred to comprising two sleeves, each of which is secured at one end only to a rotating part submitted to torsional stresses, a scale carried upon one of said sleeves, a microscope carried by the other sleeve and having its eyepiece arranged for radial observation and a stationary baffle surrounding the rotating parts and having an observation aperture therein through which the image of the scale in the field of the microscope may be viewed.

4. A torsion meter of the kind referred to comprising two sleeves, each of which is secured at one end only to a rotating part submitted to torsional stresses, a scale carried upon one of said sleeves, a microscope carried by the other sleeve and having its eyepiece arranged for axial observation, and a stationary baffle surrounding the rotating parts and having an observation aperture therein through which the image of the scale in the field of the microscope may be viewed.

5. A torsion meter of the kind referred to comprising two members respectively secured at axially separated points to a rotating part submitted to torsional stresses, a scale carried by one of said members, a microscope carried by the other member and cooperating with the scale to give an enlarged indication of the relative angular displacement of said members, a stationary baffle surrounding the rotating parts and having an observation aperture through which the image of the scale in the field of the microscope may be viewed and means carried by said stationary baffle for illuminating said scale.

WILLIAM JAMES GUTHRIE.
VICTOR WILLIAM HENRY TOWNS.